United States Patent Office 3,326,076
Patented June 20, 1967

3,326,076
ANGULAR ALIGNMENT ERROR MEASURING SYSTEM
Solomon Burg, Bethesda, Md., assignor to the United States of America as represented by the Secretary of the Navy
Filed Aug. 29, 1962, Ser. No. 220,926
1 Claim. (Cl. 88—14)

The invention described herein may be manufactured and used by or for the Government of the United States of America for governmental purposes without the payment of any royalties thereon or therefor.

The present invention relates generally to an angular alignment error measuring system and more particularly to an optical-electrical collimating system for measuring the small angular alignment error between a missile stable platform and a ship's navigational reference.

An object of the present invention is to provide a collimating system for measuring an angular alignment error and establishing a correction signal to the missile fire control system prior to launching.

Another object of the present invention is to provide an optical-electrical system for comparing a reflected light beam with a transmitted light beam and producing an electrical error signal having a magnitude relating to the angular difference of the light beams and a polarity indicating the directional error.

A further object of the present invention is to provide for the measurement of an optical error that is proportional to a missile mechanical misalignment and the conversion of the optical error into a proportional electrical error signal.

Another object of the present invention is to provide an arrangement of the missile and navigational systems stable platforms with the same order resulting in a compatible system therebetween that measures both dynamically and statically the misalignment between the outer gimbals of the stable platform.

Still another object of the present invention is to provide a collimating system with the mounting of a porro prism on the missile stable platform resulting in the elimination of any need to correct for elevation errors between the missile and navigational stable platforms.

Other objects and many of the attendant advantages of this invention will be readily appreciated as the same becomes better understood by reference to the following detailed description when considered in connection with the accompanying drawings wherein.

Figure 1:
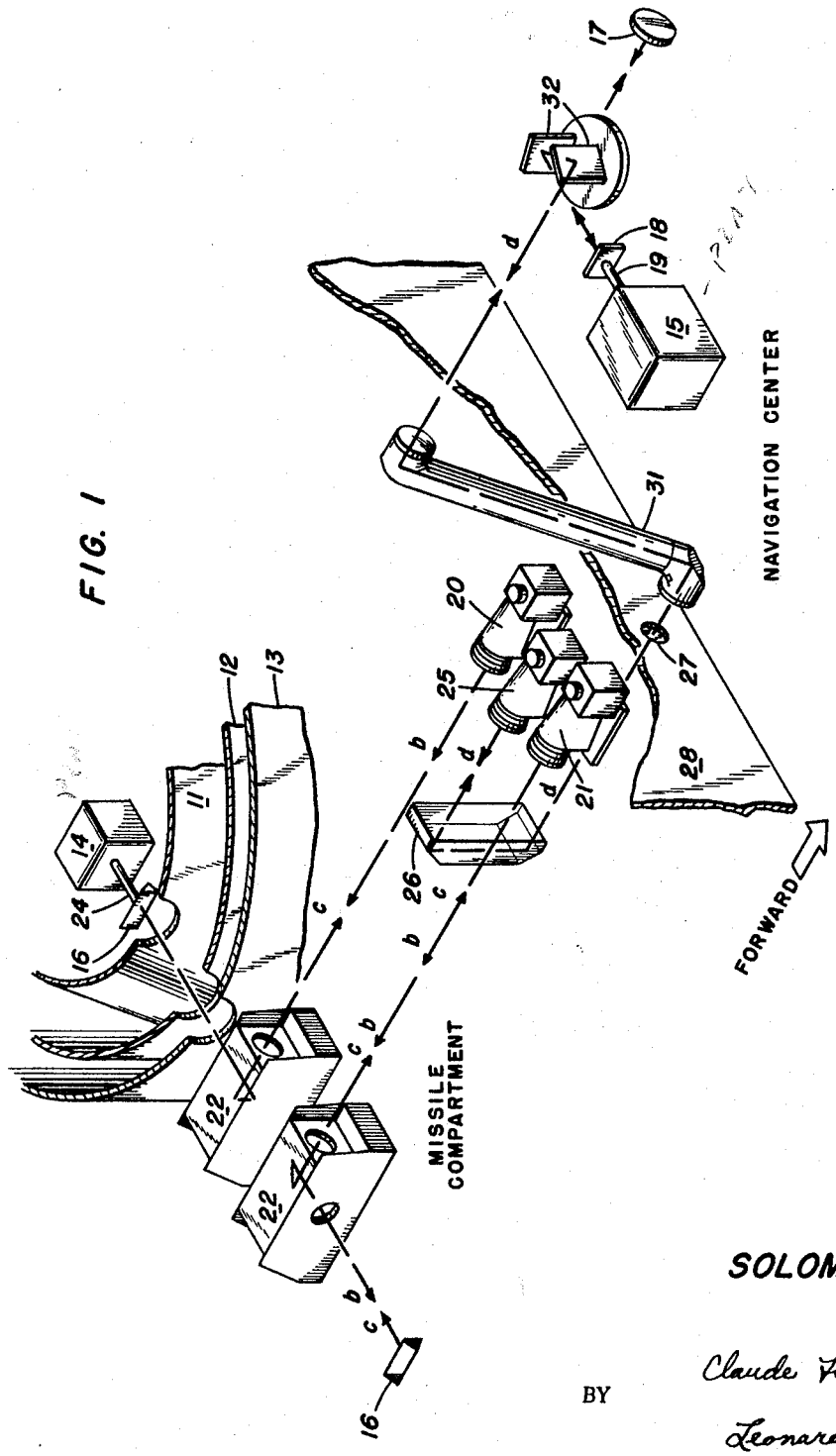
FIG. 1 is an optical schematic perspective view of an embodiment of the present invention.

When a missile 11 is initially placed in the inner launching tube 12 within the outer launching tube 13, a small angular alignment error or displacement angle will exist between the missile stable platform 14 and the ship's inertial navigational system 15. This alignment error is also varied by a slight motion of the missile within the launching tube 13 and continuously varied by the roll and pitch of the ship. If the alignment error is not compensated for, it will result in an azimuth error in the alignment of the missile stable platform at launch. The alignment error is determined by measuring the angular deviation $z$ in the deck plane of the ship between a normal to a reflector or porro prism 16 on the outer gimbal 24 of the missile stable platform 14 and the normal to the optical reference device mirror 17 or a mirror 18 on the outer gimbal 19 of the ship's inertial navigational system 15.

The stable platforms of the missile and the navigational systems are arranged with the outer gimbal axis in an athwartship direction with the gimbals in the same order. Thus the two platforms form a compatible system influenced by the various motions of the ship in the same manner.

Referring to FIG. 1 a collimated light beam $b$ is transmitted from either port or starboard photo-electric optical autocollimators 20 and 21 to an azimuth error indicator 22 carried by an alignment trolley (not shown). The azimuth error indicator 22 deviates the light beam 90° causing it to strike the porro prism or reflector 16 mounted on the outer gimbal axis 24 of the missile stable platform 14. When a missile is angularly misaligned in azimuth, the porro prism 16 is similarly misaligned. The light beam $b$ reflected from prism 16 is light beam $c$ which is not parallel with the incident light beam $b$ by an amount that is related to the prism misalignment or displacement angle $z$.

The correlation between the missile misalignment and porro prism misalignment follows from the arrangement of the stable platforms of the missile. Since the inner gimbal is vertically stabilized initially, the middle gimbal is likewise vertically stabilized and the middle gimbal axis is accordingly horizontally stabilized. Since the porro prism is mounted on the outer gimbal axis with the axis of the porro prism parallel to the middle gimbal axis, the porro prism is horizontally stabilized and would have the same misalignment that the missile has. In addition, since the porro prism 16 and the mirror 18 are both horizontally stabilized, any elevation deviation between the outer gimbal axes of the two stable platforms 14 and 15 would not affect the measurement of the displacement angle $z$. Thus the particular mounting of the porro prism 16 and the mirror 18 on the outer gimbal axes eliminates the necessity of correcting for any elevation error or deviation.

The azimuth error indicator 22 deviates the returning light beam through 90° back to its originating photo-electric autocollimator 20. Photo-electric autocollimator 20 compares the reflected light beam $c$ with the transmitted light beam $b$ and produces an electrical error signal that has a magnitude that is related to an angular difference between the light beams and a polarity which indicates the direction of error. The port and starboard photo-electric autocollimators 20 and 21 are aligned with the center photo-electric autocollimator 25 to a common azimuth reference. Autocollimator 25 is aligned to the optical reference device mirror 17, parallel to the own ship centerline or the alongship reference axis.

The center photo-electric autocollimater 25 projects its light beam $d$ to a reference periscope 26 which changes the direction of the light beam $d$ 180° to pass through window 27 in bulkhead 28 which separates the missile compartment from the navigational center. Light beam $d$ enters an alignment periscope 31 that deviates the outgoing path so that it is parallel with the incoming path, and translated in both the horizontal and vertical planes. The output light beam from alignment periscope 31 is passed directly through alignment pentamirror 32 to the optical reference device mirror 17 or during testing is deviated 90° by the alignment pentamirror 32 to mirror 18 on the outer gimbal axis 19 of the ship's inertial navigational system 15. Since the light beam $d$ is always normal to the middle gimbal axis of the navigational system, the mirror 18 need only be a plane mirror instead of a porro prism.

The reference mirror 17 or the navigational mirror 18 reflects the light beam $d$ back to the center photo-electric autocollimator 25 through the same path. When the photo-electric autocollimators 20, 21 and 25 are installed the center autocollimator 25 is optically aligned so that the transmitted and reflected optical paths are parallel and the port and starboard autocollimators 20 and 21 are optically parallel to the center autocollimator 25. Therefore, the light from the port and starboard autocollimators to the azimuth error indicators 22 are aligned in the azimuth plane. The electrical output of the autocollimator 20 formed by the optical comparison of the transmitted and reflected light beams $b$ and $c$ from the azimuth error indicator is proportional to the angular misalignment in azimuth of the stable platform porro prism 16 with respect to the azimuth reference position mirror 17 or the navigational mirror 18. The measured angular difference between the transmitted and reflected light beams $b$ and $c$ is $z$ as shown in FIG. 4 which illustrates in a horizontal plane the relationship between various gimbal axes of the missile and the gimbal axes of the ship's inertial navigational system, SINS.

Figure 4:
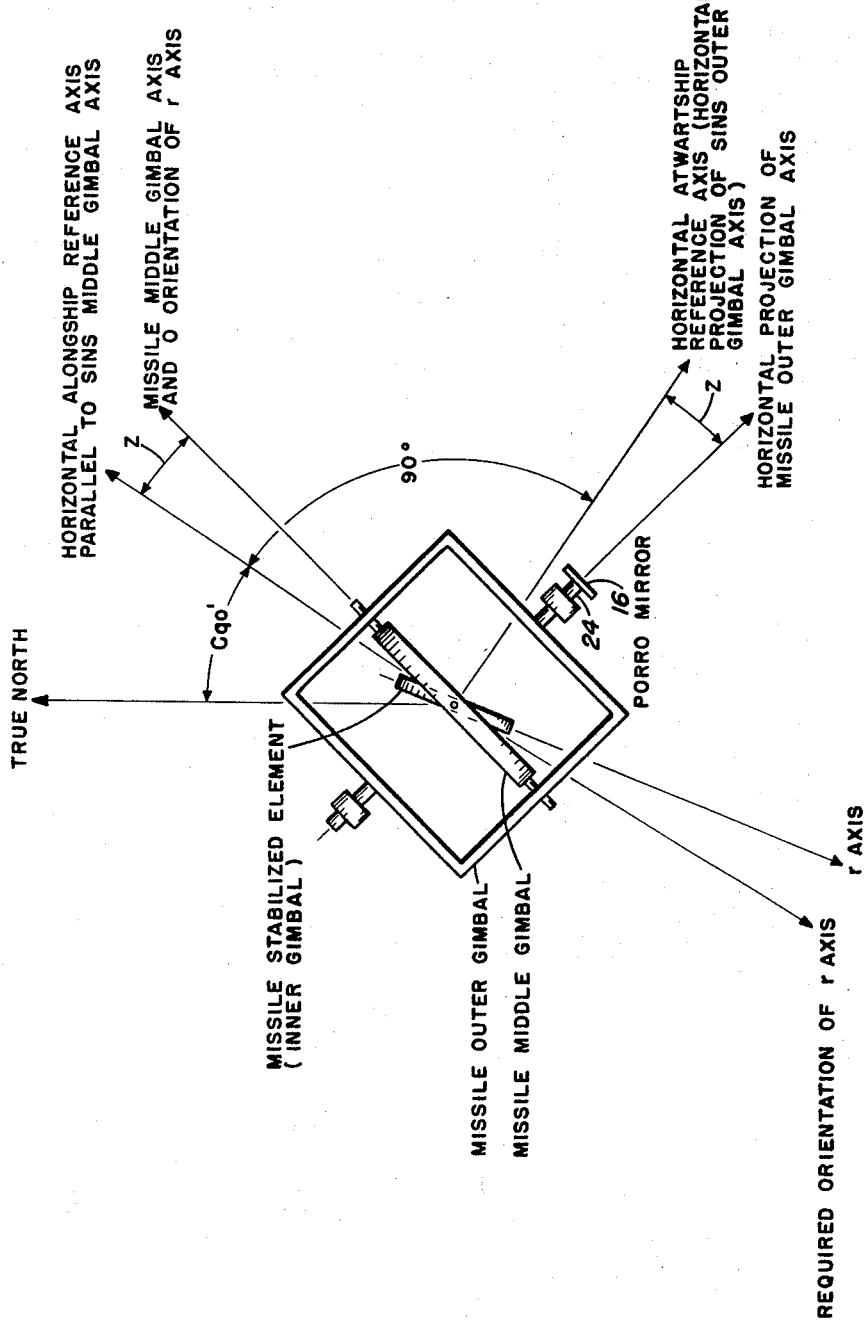
FIG. 4 is a horizontal plan view of the alignment angles for a missile stable platform in relation to the ship's navigational angles.

As shown in FIG. 4, the angle $Cqo'$ is not the true ship's bearing since the SINS outer gimbal axis is mounted athwartship rather than in the usual manner along the ship center line. For computational purposes, 90° is added to the measurement of orientation of the inner gimbal of the SINS to the outer gimbal axis. The displacement angle $z$ is the angle between the ship's inertial navigational system middle gimbal axis and the missile stable platform middle gimbal axis and indicates the azimuth error between the navigational system and the missile stable platform. Since the middle and outer gimbals of the navigational system are perpendicular and the middle and outer gimbals of the missile stable platform are likewise perpendicular, the angular difference between the two outer gimbals is equal to the displacement angle $z$ when the outer gimbals are in the horizontal plane, that is, when the deck plane coincides with the horizontal plane. FIG. 4 indicates similarly the amount of $r$ axis rotation of the inner gimbal or vertically stabilized element required to correct for the azimuth misalignment as measured on the displacement angle $z$.

Figure 2:
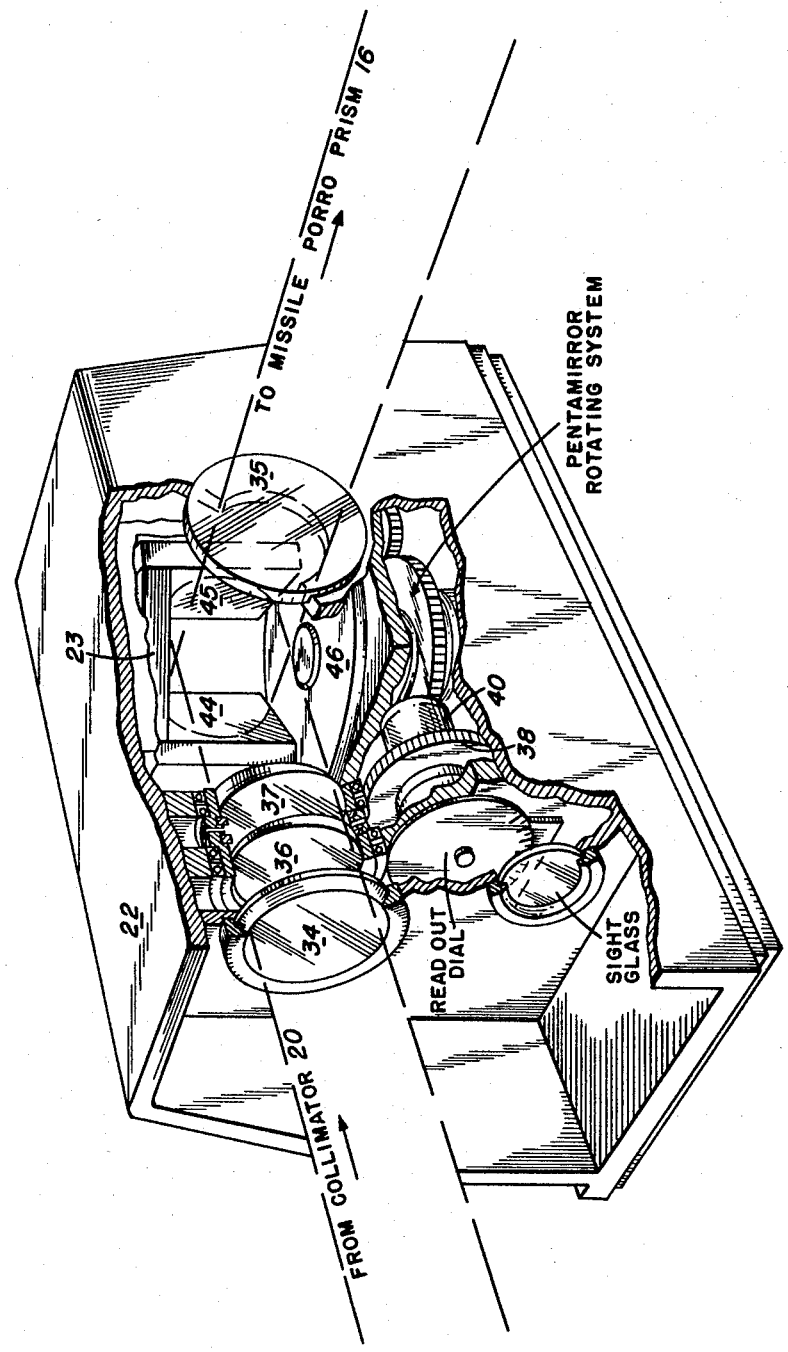
FIG. 2 is a perspective view of the azimuth error indicator of the present invention with portions broken away for illustration of the interior thereof.
Figure 3:
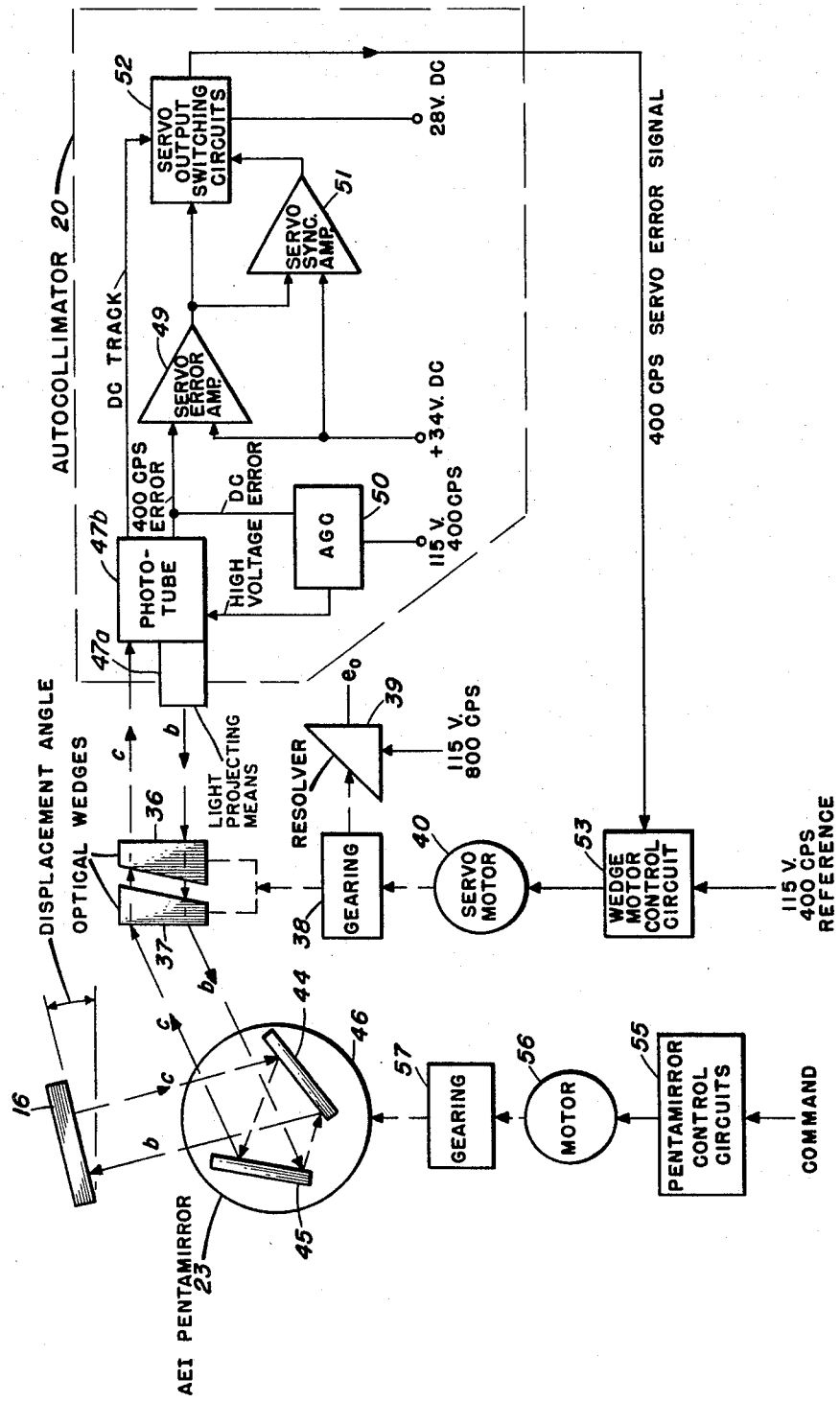
FIG. 3 shows a block diagram of an embodiment of the present invention.

Referring now to FIGS. 2 and 3 the structural arrangement of the components of the azimuth error indicator 22 are shown. An optical glass window 34 is located on the forward end of the azimuth error indicator to allow passage of optical light to and from the autocollimator 20, the other window 35 located on the side of the indicator housing toward its after end allows passage of a light beam between the indicator and the missile porro prism 16. The forward part of the indicator housing contains a wedge drive unit comprising a pair of contra-rotating optical wedges 36, 37, a gear drive system 38, a resolver 39, and a servo motor 40. The prismatic wedges 36 and 37 work with the optical servo or autocollimator 20 to eliminate the angular difference between the position of the reference optical path $b$ and the position of the optical path $c$ reflected from the missile porro prism 16. The autocollimator 20 compares the optical light paths for an optical error and produces an electrical feedback error signal relative thereto. In response to the electrical error signal, the servo motor 40 rotation is transmitted through a reduction gearing 38 of the wedges 36 and 37 which slowly rotate at identical speeds in opposite directions to refract the light from the porro prism 16 and the light from the collimator 20 into parallelism in the azimuth plane. The servo motor 40 nulls when the reflected beam $c$ is returned by the contra-rotating wedges 36 and 37 in a direction coincident with the collimated light beam $b$. At the null point of the servo motor, the rotation of the wedges is a direct measure of the angle $z$.

The wedge gearing 38 also drives a resolver shaft at the same speed as the wedges. The driven resolver 39 provides an electrical output voltage that is a function of the angle through which the wedges have turned as proportional to the porro prism displacement $z$. The resolver shaft also drives an illuminated readout dial that is visible through a sight glass on the forward end of the indicator housing.

Between the optical wedge prisms 36, 37 and the after end of the housing of the azimuth error indicator, a pentamirror 23 is placed. The pentamirror 23 is composed of two front surface mirrors 44 and 45 mounted to a common base 46 at an angle of 45° to one another and aligned in the plane of the optical light path from the wedge prisms 36 and 37. The pentamirror surfaces 44 and 45 as shown in FIG. 2 deviate the input light path from the collimator 20 by an angle of 90° through window 35 to the missile porro prism 16. The pentamirror base 46 is supported by ball bearings (not shown) to permit the pentamirror to rotate about a precise axis.

The electro-optical operation of the present invention of an azimuth alignment system will be better understood by referring to FIG. 3 wherein the photo-electric autocollimator 20 projects a light beam $b$ from light projecting means $47a$ through the optical wedges 36, 37 and pentamirror 23 of the azimuth error indicator 22 to the missile porro prism 16. The autocollimator 20 in its phototube $47b$ compares the reflected light $c$ from the missile porro prism 16 with the projected light $b$ for angular displacement of the porro prism from the common azimuth reference. Multiplier phototube $47b$ changes this optical error into a 400-cycle electrical error signal having a D.C. component. The 400-cycle error signal has an essentially constant amplitude that is caused by the presence of remote reflector displacement and a phase relationship with respect to a 400-cycle reference voltage that is indicative of the direction of reflector displacement. The D.C. component of the electrical error signal indicates that the reflected light $c$ is present in the autocollimator and used as a track relay command signal for the servo output switching circuits 52 and is also connected to automatic gain control circuit 50 which responds to the D.C. error and varies the high D.C. voltage applied to the photo-multiplier tube $47b$ to maintain the gain of the tube at a constant value.

The servo error amplifier 49 accepts the 400-cycle error signal, amplifies it and connects it to the servo synchronism amplifier 51 and servo output switching circuits 52. The amplifier 51 senses when the amplitude of the error signal falls below a predetermined value and provides a relay energizing signal to indicate that the error is at this null. The servo output switching circuit 52 connects the servo error signal to the motor control circuit 53 of the azimuth error indicator. The D.C. track signal from the phototube, when present at switching circuit 52, will cause the switching from the search mode of wedge operation to the tracking mode allowing the wedges to be driven directly by the 400-cycle error signal.

The wedge motor control circuit 53 receives a 400-cycle reference and a 400-cycle error signal and functions in a search and track mode to drive the optical wedge prisms 36, 37 to a position of optical null. The search mode of wedge operation is in effect so long as the D.C. track signal is not received by the servo switching circuit 52. The motor 40 through gearing 38 rotates each wedge prism in opposite direction either clockwise or counterclockwise varying the physical relationship between the surfaces and the refractive relationship between the light beams until the returning light beam $c$ enters the phototube $47b$ of the autocollimator 20. After the reception of the D.C. track signal at the servo output switching circuit 52; the operation of the wedges 36, 37 will follow the 400-cycle error signal received from output circuit 52 until the null in the error signal is reached.

Resolver 39 is driven by the wedge servo motor 40 through a reduction gearing 38. The 115 800-cycle reference signal to the resolver is applied when a D.C. track signal is indicated by the phototube. When the optical wedges 36 and 37 are in position of zero error, the transmitted beams $b$ entering and leaving the wedges are not parallel to each other as shown in FIG. 3. The same condition holds true for the reflected beams $c$; however, the wedges have been so turned that their refracted quantities cause the transmitted and reflected beams $b$ and $c$ between the wedges and the autocollimator 20 to be parallel. The resolver 39 is rotated through the same distance as the wedges 36, 37 by the same mutually driven gearing 38 and, therefore, the electrical output signal from the resolver is a function of the wedge rotation angle and similarly the displacement angle $z$ of the porro prism 16 in the deck plane. The resolver electrical output signal $e_o$ is fed to a deck tilt correction circuit for translation into the horizontal plane. The deck tilt correction circuit multiplies the measure of the $z$ angle in the deck plane by $1 + \frac{1}{2} \sin^2 Z_o$ to give a measure of the $z$ angle in the horizontal plane where $Z_o$ is the roll angle of the ship. The measure of the $z$ angle in the horizontal plane is fed to the fire control system for proper correction of the azimuth error before the launching of the missile.

The azimuth error indicator 22 includes pentamirror rotating system with a pentamirror control circuit 55, D.C. motor 56, and gearing 57 for positioning the pentamirror 23 on appropriate commands by rotations of the pentamirror base 46 to either a port, starboard or test position. In the port position, the pentamirror reflects the light path through an optical window 35 in the port side of the indicator; in the starboard position, the pentamirror reflects the light from the port collimator 20 through an optical window in the starboard side if the starboard collimator is disabled; and in the test position, the pentamirror reflects incoming light directly back to the collimator. In this last position during optical alignment checks, the pentamirror 32 may be moved to a preset position that allows 90° deviation of the light beam $d$ to the mirror 18 on the ship's inertial navigation system 15. In this manner the center autocollimator 25 can evaluate the reflector position or the presence of flexure in the navigational system 15.

Obviously many modifications and variations of the present invention are possible in the light of the above teachings. It is therefore to be understood that within the scope of the appended claims the invention may be practiced otherwise than as specifically described.

What is claimed is:

An angular alignment error measuring system for determining continuously the misalignment between the stable platforms of a missile and a navigational system of a ship comprising:
  an optical reference device mirror aligned with the ship centerline,
  a ship's navigational system stable platform with the inner gimbal vertically stabilized placed athwart a ship carrying a vertically disposed missile,
  a missile stable platform with the inner gimbal vertically stabilized,
  a porro prism mounted on the outer gimbal axis of said missile stable platform,
  a second mirror mounted on the outer gimbal axis of said ship's navigational system stable platform and correlated to said optical reference device mirror,
  first and second photo-electric auto-collimating means disposed between said missile stable platform and said optical reference device mirror,
  said first photo-electric auto-collimating means providing and projecting a first collimated light beam to said optical reference device mirror whereby alignment of said first photo-electric auto-collimating means is achieved,
  angle error indicating means,
  a second photo-electric auto-collimating means optically aligned with said first auto-collimating means for generating and transmitting a second collimated light beam directed oppositely from said first light beam and optically parallel with said first light beam to said error indicating means, said error indicating means transferring said second light beam to said porro prism and transferring a reflected light beam of said second light beam from said porro prism to said second photo-electric auto-collimating means,
  said second photo-electric auto-collimating means receiving said reflected light beam and providing an electrical error signal that is continuously indicative of the angular position of the missile stable platform with respect to the ship centerline,
  said angle error indicating means having mechanically operated optical means for eliminating any angular difference between said transmitted referenced light beam and said reflected beam,
  said mechanically operated optical means comprising wedge prisms for deviating said transmitted referenced light beam and said reflected light beam incident thereon,
  said angle error indicating means in addition to said optical means comprising a pentamirror for transferring said light beams between said photoelectric auto-collimating means and said porro prism, and
  a servo motor connected to said wedge prisms for rotating said prism in axially opposite directions to vary the physical relationship between said transmitted referenced light beam and said reflected light beam, said electrical signal being applied to said servo motor to contra-rotate said prisms until said beams are in parallelism thereby yielding a signal proportional to said misalignment.

References Cited

UNITED STATES PATENTS

| | | | |
|---|---|---|---|
| 2,563,780 | 8/1951 | Fontaine | 88—14 |
| 2,870,671 | 1/1959 | Falconi | 88—14 |
| 2,927,502 | 3/1960 | Watrous | 88—22.5 |
| 2,950,428 | 8/1960 | Gievers. | |
| 2,952,779 | 9/1960 | Tallely | 88—14 X |
| 2,998,746 | 9/1961 | Gievers | 88—14 |
| 3,055,263 | 9/1962 | Kuehne | 88—14 |
| 3,060,792 | 10/1962 | Brunson | 88—14 |

OTHER REFERENCES

Longwell, IBM Technical Disclosure Bulletin, vol 3, No. 7., December 1960.

JEWELL H. PEDERSEN, *Primary Examiner.*

T. L. HUDSON, A. A. KASHINSKI,
*Assistant Examiners.*